March 11, 1952 — H. A. SHERWOOD — 2,588,889
MOTOR WHEEL AND MOUNTING STRUT
Filed July 22, 1948 — 2 SHEETS—SHEET 1
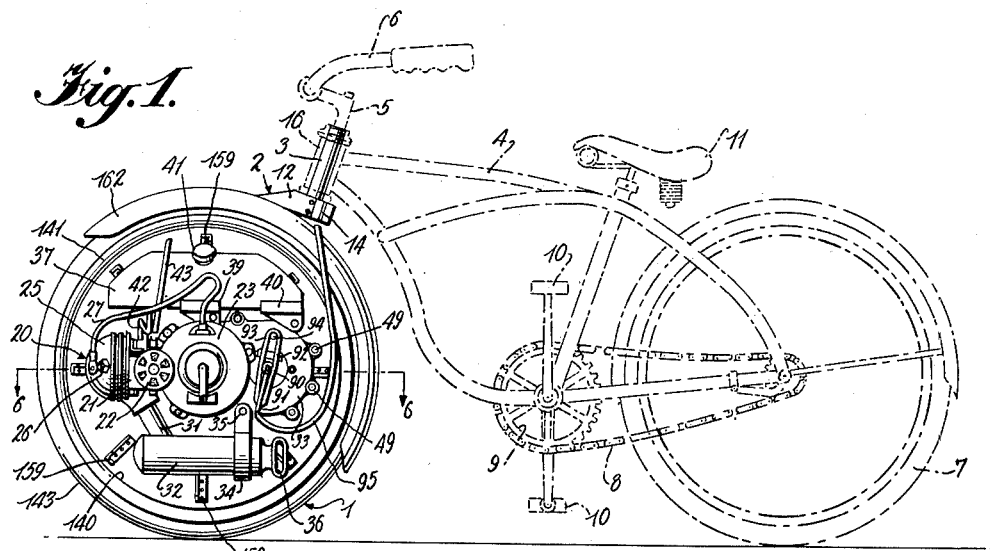
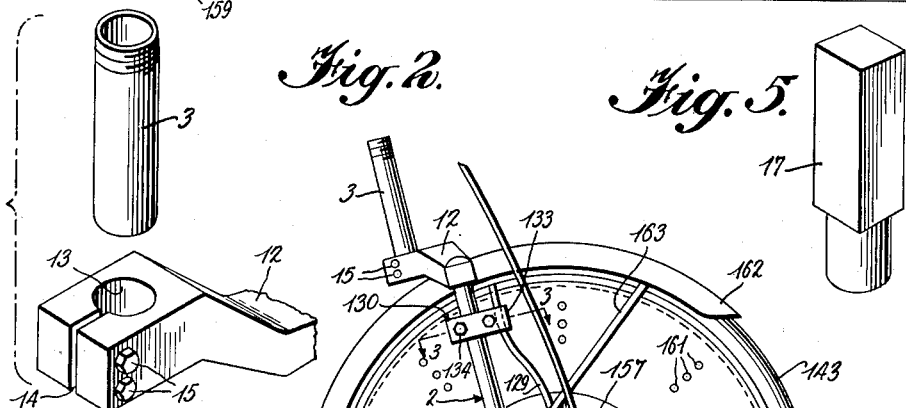
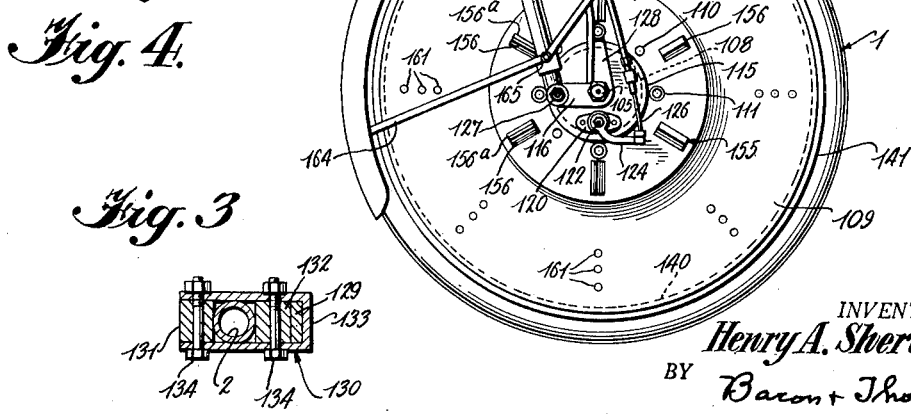
INVENTOR.
Henry A. Sherwood
BY Baron + Thomas
ATTORNEYS March 11, 1952     H. A. SHERWOOD     2,588,889
MOTOR WHEEL AND MOUNTING STRUT
Filed July 22, 1948     2 SHEETS—SHEET 2

INVENTOR.
Henry A. Sherwood
BY Bacon + Thomas
ATTORNEYS

Patented Mar. 11, 1952

2,588,889

UNITED STATES PATENT OFFICE 2,588,889

MOTOR WHEEL AND MOUNTING STRUT

Henry A. Sherwood, Tarrytown, N. Y., assignor to Adrienne M. Sherwood, Tarrytown, N. Y.

Application July 22, 1948, Serial No. 40,048

20 Claims. (Cl. 180—33)

The present invention relates to a motor wheel unit having general utility as a traction device for various types of self-propelled vehicles including bicycles, three or four-wheel vehicles, motor scooters, small tractors, etc.

More particularly, the invention relates to a new and improved power wheel and to a novel mounting strut for mounting the wheel upon any suitable frame. The wheel and strut are so designed that they constitute a compact, sturdy and powerful unit adapted for use wherever it is desired to employ a power wheel. The unit is equally useful regardless of whether the wheel is to serve as a steerable driving wheel, or as a non-pivoting driving wheel.

By way of illustration only, and not limitation, the power wheel and mounting strut have been illustrated and described herein in connection with the use thereof as a steerable driving wheel for a bicycle. When so used, the power wheel and mounting strut constitute a unit adapted to be bodily substituted for the front wheel and fork of any ordinary bicycle, and the construction of the unit is such that the change-over can be made in a very short time, usually a matter of about ten to fifteen minutes. The feature of rapid installation is extremely important from both a practical and commercial point of view. This is apparent when one considers the fact that certain presently available types of auxiliary engines for bicycles require about a day's time to be mounted in the forward triangular portion of the main frame of the bicycle and to be drivingly interconnected with the rear wheel thereof. Moreover, the present power wheel unit can be quickly installed regardless of the type of main frame that a bicycle may have; whereas, auxiliary engines of the type mentioned above cannot be mounted upon a man's bicycle frame having a double cross bar without first removing the lower of the cross bars, and in no event, can such engines be mounted upon the frame of a lady's bicycle.

A further advantage of the present power wheel unit over previous frame-mounted auxiliary bicycle engines is that the power wheel unit does not set up excessive vibrations in the bicycle frame; whereas, the severe vibrations of frame-mounted auxiliary bicycle engines frequently cause the welded joints of the tubes comprising the frame to fail.

Another important feature of the present invention is that the engine is maintained relatively stationary with respect to the wheel axle, and the wheel rotates relative to the engine and axle. This has the advantage that undesirable inertia effects, common in prior motor wheels provided with rotating engines, are avoided.

A further feature of the invention is that the power wheel unit is self-contained and is complete with engine, fuel tank, transmission, clutch, brake, shock absorber, mounting strut, etc., but nevertheless is relatively light, weighing only about seventy pounds, which makes it easy to handle. The mounting strut itself is of unique construction and is quite rigid and designed to provide adequate safety at all speeds; whereas, the fork on an ordinary bicycle is not designed to withstand the increased road shocks to which it is subjected when the bicycle is powered by a frame-mounted engine and the bicycle is driven at the higher speeds provided by such engine. In addition, the mounting strut extends only on one side of the power wheel and all of the necessary engine accessories are disposed at the opposite side of the wheel and are enclosed by a readily removable cover plate so that they can be quickly reached for inspection, adjustment, etc., without removing the wheel or detaching the mounting strut. Such strut arrangement also makes it possible to change or repair a tire without demounting the wheel or strut or any other part of the unit.

A still further feature of the invention is that the weight of the engine, transmission, etc., is so distributed that the center of gravity of the power wheel unit lies approximately at but below the wheel axis.

While the present power wheel unit is a relatively recent development, tests of bicycles equipped with the same have already demonstrated its good balance, ease of maneuverability, fast pickup, good riding qualities, economy of operation, etc.

The principal object of the invention is to provide a self-contained power wheel that can be mounted upon any suitable mounting strut.

Another object of the invention is to provide a power wheel and mounting strut unit that can be readily attached to and detached from any suitable frame.

Another object of the invention is to provide a power wheel and strut unit especially adapted to be substituted for the front wheel and fork of an ordinary bicycle.

Another object of the invention is to provide a power wheel unit in which the weight of the engine, transmission, etc., is so distributed relative to the axis of rotation of the wheel that the center of gravity of the unit is below or approximately at the center of rotation of the wheel.

Still another object of the invention is to provide a motor wheel unit for propelling a bicycle, or the like, which will not require the rider to straddle a hot and greasy engine.

Still another object of the invention is to provide a power wheel unit including transmission means providing a positive drive from the engine to the wheel.

A further object of the invention is to provide a power wheel unit and mounting strut therefor arranged so that a tire can be removed from the wheel without detaching either the wheel or the strut from the vehicle frame.

A still further object of the invention is to provide a mounting strut for a power wheel including means for attaching the strut to various types of frames.

A still further object of the invention is to provide a power wheel mounting strut having means associated therewith for absorbing road shocks.

A still further object of the invention is to provide a power wheel and mounting strut therefor arranged so that the strut is secured to a stub shaft and the stub shaft supports both the engine and wheel relative to the mounting strut.

A still further object of the invention is to provide a power wheel in which the axis of rotation of the crankshaft is substantially axially aligned with the axis of rotation of the wheel.

A still further object of the invention is to provide a power wheel unit which is very compact, yet rugged and very serviceable, although inexpensive.

Other objects and advantages of the invention will be apparent from the following description taken in conjunction with the accompanying drawings, in which:

Fig. 1 is a side elevational view showing in full lines a power wheel unit, with the engine cover removed, embodying the principles of the present invention associated with a conventional bicycle frame, etc., shown in dot-and-dash lines;

Fig. 2 is a view of the power wheel unit shown in Fig. 1, but viewed from the side opposite to that illustrated in Fig. 1;

Fig. 3 is a sectional detail view taken on the line 3—3 of Fig. 2;

Fig. 4 is a perspective view of the post and supporting arm carried by the upper end of the mounting strut;

Fig. 5 is a perspective view of a modified form of post;

Figures 6, 7:
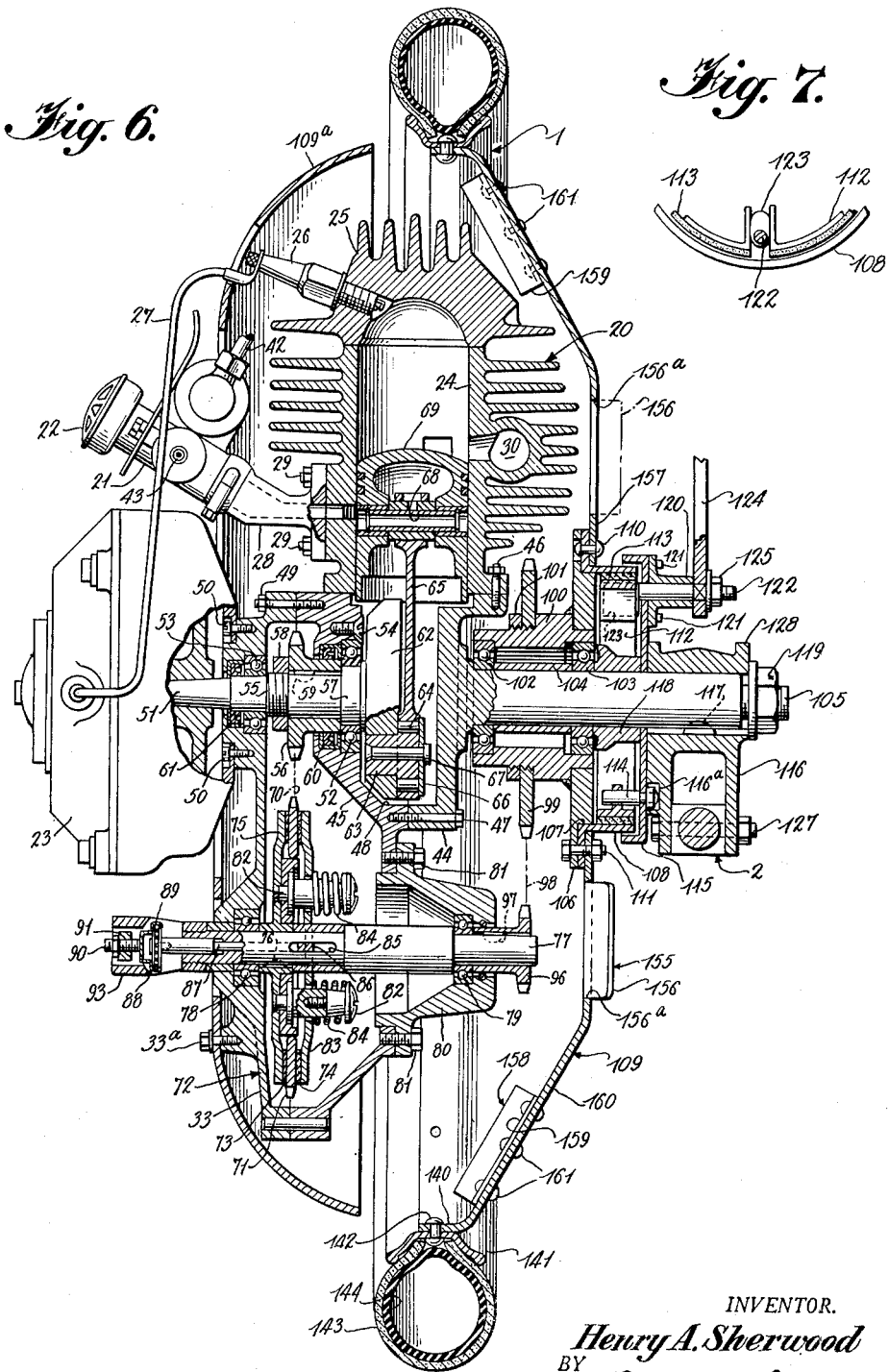
Fig. 6 is a horizontal sectional view through the power wheel taken along the line 6—6 of Fig. 1, but with the brake actuating lever shown out of its normal position to facilitate illustration.
Fig. 7 is a fragmentary detail view illustrating a portion of the brake and the brake actuating cam.

Referring now to Fig. 1, the numeral 1 generally identifies the power wheel and the numeral 2 generally identifies the mounting strut. The manner of securing the strut 2 in operative relation relative to the power wheel 1 will be described in detail hereinafter. The wheel 1 and strut 2 have been illustrated in full lines in Fig. 1, as a replacement for the front wheel and fork of an ordinary bicycle shown in dot-and-dash lines, the strut 2 having a post 3 mounted at the forward end of the main frame 4 of the bicycle, in the same manner as the post at the upper end of a conventional front fork. A handle bar support 5 is associated with the post 3 in the same manner in which it is normally associated with a conventional front fork and carries the usual handle bar 6. A rear wheel 7 is mounted on the frame 4 and is driven by a chain 8 through the usual sprocket 9 and foot pedals 10. A bicycle seat 11 is mounted upon the frame 4 in the usual manner.

It will be noted from Figs. 2 and 4 that the upper end of the strut 2 has one end of an arm 12 secured thereto, the other end of said arm being offset and provided with an opening 13 adapted to receive the lower end of the post 3. The arm 12 is provided with a slot 14 extending outwardly from the opening 13, and bolts 15 extend across the slot 14 to clamp the lower end of the post 3 to the arm 12. The forward portion 16 (Fig. 1) of the frame 4 varies in height and diameter among the many makes of bicycles on the market, and the arm 12 is thus adapted to receive posts (not shown) having a lower end of a suitable size to be received in the opening 13, but otherwise varying in diameter and height to accommodate the particular bicycle in which the motor wheel unit is to be installed. It will be apparent that the upper portion of the mounting post carried by the arm 12 may be square, as indicated at 17 in Fig. 5, instead of round, particularly in installations where the wheel and strut are intended to be fixed against rotation relative to a frame (not shown) and the motor wheel 1 is not intended to be used for steering.

In Figs. 1 and 6, an internal combustion engine of known type is generally identified by the numeral 20 and is provided with a conventional carburetor 21, air cleaner 22, and a flywheel type magneto 23. The engine 20 comprises a housing or casing including a cylinder 24 having a head 25 suitably secured to the outer end thereof by bolts (not shown). A spark plug 26 is mounted in the head 25 and is connected by an ignition wire 27 with the magneto 23. The carburetor 21 is carried by an inlet manifold 28 (Fig. 6) mounted upon the cylinder 24 by studs 29. The cylinder 24 has an exhaust opening 30 which communicates with one end of an exhaust manifold 31 (Fig. 1), the opposite end of said exhaust manifold being connected with a muffler 32. The muffler 32 is secured to a clutch cover housing 33 by a strap 34 and screw 35. The muffler 32 has an exhaust end 36, which projects at substantially right angles to the plane of the motor wheel 1 and is disposed close to the roadway so that objectionable exhaust fumes do not annoy the rider. A fuel tank 37 (Fig. 1) for gasoline or other suitable liquid fuel is mounted upon the engine housing by brackets 39 and 40. The fuel tank 37 has a filler cap 41, which is adapted to be removed to permit filling of said tank. A fuel line 42 has one end thereof connected with the bottom of the tank 37 and its opposite end is connected with the intake of the carburetor 21. The throttle (not shown) of the carburetor 21 is controlled by a Bowden wire 43 adapted to be actuated by a lever (not shown) preferably conveniently mounted upon the handle bar 6.

The lower end of the cylinder 24 (Fig. 6) is mounted upon engine housing sections 44, 45 by a plurality of studs 46. The housing sections 44 and 45 are secured together by a plurality of cap screws 47 and are recessed so as to function as a crankcase 48. The clutch housing cover 33, previously referred to, is secured to the housing section 45 by a plurality of studs 49. The casing of the magneto 23, also previously referred to, is secured to the clutch housing cover 33 by a plurality of cap screws 50. The flywheel magneto 23 is driven by a crankshaft 51, which is rotatably supported in the housing section 45 and the clutch housing cover 33 by ball bearings 52 and 53, respectively. The ball bearing 52 is retained against inadvertent displacement in the housing section 45 by the head of a screw 54 engaged with the outer race thereof. The ball bearing 53 is retained in the clutch cover 33 by a shoulder 55 formed on the crankshaft 51. A small drive sprocket 56 is disposed on the crankshaft 51 between an enlargement 57 of said crankshaft and a nut 58 and is secured against rotation relative to said shaft by a key 59. A leakproof seal 60 surrounds the hub portion of the sprocket 56 and forms a seal disposed axially outwardly of the ball bearing 52, and packing means 61 surrounds the shaft 51 and is disposed axially outwardly of the ball bearing 53.

The crankshaft 51 includes an enlarged portion 62 disposed within the crankcase 48. A hardened crank pin 63 is mounted in the enlarged portion 62 and forms the inner race for a roller bearing 64. The rollers of the bearing 64 are interposed between the crank pin 63 and the lower end of a connecting rod 65, a plate 66 retaining the lower end of said connecting rod and rollers in assembled relation with the crank pin 63 by means of a rivet 67. The upper end of the connecting rod 65 is connected by a wrist pin 68 to a piston 69 slidably mounted in the cylinder 24.

The engine 20 is of the two-cycle type and operates in a well understood manner. Upon reciprocation of the piston 69 in the cylinder 24, the connecting rod 65 will impart rotation to the crankshaft 51 and effect driving of the flywheel magneto 23 so long as the engine is in operation and thus provide the high tension voltage necessary for spark ignition by the spark plug 26. Likewise, the driving sprocket 56 will be driven upon rotation of the crankshaft 51. The driving sprocket 56 is connected by a chain 70 to a relatively large clutch sprocket 71 forming a part of a conventional manually operable clutch 72. One side of the sprocket 71 has friction facing material 73 mounted thereon and the other side has friction facing material 74 mounted thereon. The friction material 74 is engaged by the outer marginal portion of a clutch plate 75 secured by a key 76 to a countershaft 77. The countershaft 77 is parallel with the crankshaft 51 and is supported adjacent one end thereof by a ball bearing 78 mounted in the clutch housing cover 33, and is supported adjacent its opposite end by a ball bearing 79 mounted in a mound-shaped housing 80 secured to the housing section 45 by cap screws 81.

The clutch disc 75 carries a plurality of studs 82, which slidably support a second clutch plate 83 having its outer marginal portion adapted for engagement with the friction facing material 74. A spring 84 is so mounted upon each of the studs 82 as to urge the clutch plates 75 and 83 into engagement with the friction facings 73 and 74, respectively, carried by the sprocket 71, whereby to transmit driving torque applied to said sprocket, by the drive sprocket 56 and chain 70, to the countershaft 77 through the clutch plate 75 at a reduced speed.

The countershaft 77 is provided with an elongated slot 85 extending transversely therethrough and having a bar 86 slidably mounted therein with its ends engaging the clutch plate 83. One end of a pin 87 engages one side of the bar 86 and the opposite end of said pin carries a ball thrust bearing 88 partially enclosed by a housing 89. The housing 89 is engaged by one end of an adjustable screw 90 carried by a clutch actuating arm 91, pivotally mounted upon a pin 92 carried by a bracket 93, which is secured to the clutch cover housing 33 by cap screws 94. A Bowden wire 95 has one end thereof connected with the lower end of the lever 91 and is adapted to be actuated by a lever (not shown) suitably mounted upon the handle bar 6 to effect disengagement of the clutch.

Thus, it will be apparent from Fig. 6 that, as the pin 87 is moved toward the right, upon actuation of the clutch lever 91, it will cause the bar 86 to move in a corresponding direction and move the clutch plate 83 in a direction away from the sprocket wheel 71 to thereby effect disengagement of the clutch 72 and thereby interrupt the drive of the countershaft 77. Upon release of the pressure applied through the Bowden wire 95 to the clutch operating lever 91, the springs 84 will again effect driving engagement between the sprocket 71 and the clutch plates 75 and 83 and thereby impart rotation to the countershaft 77.

A small sprocket 96 is secured by a key 97 to the countershaft 77 at a point outwardly of the ball bearing 79. A chain 98 drivingly interconnects the sprocket 96 with a relatively large sprocket 99, which is threadedly secured upon a wheel mounting sleeve 100 and locked thereon by a nut 101. The sleeve 100 is rotatably supported by ball bearings 102 and 103 spaced apart by a spacer ring 104, and all are mounted upon a stationary supporting bar or stub shaft 105 preferably, but not necessarily, formed integral with the engine housing section 44 and having its axis substantially in alignment with the axis of the crankshaft 51. An annular flange 106 is welded or otherwise secured to the sleeve 100 and rabbeted at 107 to form a seat for a brake drum 108. A dish-shaped disc wheel 109 is secured to the brake drum 108 by a plurality of rivets 110, and the assembled wheel and brake drum are secured to the flange 106 by a plurality of bolts 111 arranged in alternating relation with the rivets 110. The wheel 109 has its concave side adjacent the engine 20 and partially encloses one side of said engine. The brake drum 108 contains a flexible brake band 112 having a strip of friction material 113 suitably secured thereto. The band 112 is held against rotation by an anchor pin 114 carried by a plate 115. The supporting or stub shaft 105 extends through the plate 115 and one end of an arm 116 is non-rotatably secured to the shaft 105 by a key 117 at a region located axially outwardly of the wheel 109. The arm 116 has a recess 116ª receiving the head of the anchor pin 114 to thereby secure the plate 115 against rotation. A spacer 118 is disposed between the ball bearing 103 and the plate 115, and a nut 119 is threaded on the outer end of the stub shaft 105 and clampingly mounts the ball bearing 102, sleeve 104, ball bearing 103, sleeve 118, plate 115 and arm 116 on said stub shaft.

A bracket 120 is secured to the plate 115 by a plurality of screws 121. A shaft 122 is rotatably supported in the bracket 120 and carries a flat cam 123 disposed between the adjacent ends of the brake band 112. A brake operating arm 124 is mounted in non-rotatable relation with the shaft 122 by a lock nut 125. A Bowden wire 126 (Fig. 2) is secured to the free end of the brake operating arm 124 and is adapted to be actuated by a lever (not shown) suitably mounted on the handle bar 6 (Fig. 1) to rotate the arm 124 and through the action of the cam 123 move the ends of the brake band 112 apart to engage the friction material 113 with the brake drum 108 and thereby slow down or stop the power wheel 1.

The manner of driving the countershaft 77 from the drive sprocket 56 at a reduced speed has already been described, and it will be apparent that the drive for the wheel 109 is completed at a still further reduced speed from the small sprocket 96 on the countershaft 77 through the chain 98 and the relatively large driven sprocket 99 on the sleeve 100, so that a positive drive through sprockets and chains is effected between the engine 20 and the wheel 109.

The lower end of the mounting strut 2 (Figs. 2 and 6) is pivotally connected with the arm 116 by a shackle bolt 127. The arm 116 includes upwardly projecting fingers 128 to which the lower end of a spring bar 129 is welded or otherwise suitably secured. The spring bar 129 is curved and the upper end thereof extends through a snubber 130 (Figs. 2 and 3) mounted upon the strut 2 at a point remote from the shackle bolt 127. The snubber 130 comprises blocks 131 and 132 arranged upon opposite sides of the strut 2, and a metal strap 133 which extends around the blocks 131 and 132 and in front of the spring bar 129, so that said spring bar is frictionally disposed between the strap 133 and the block 132. Bolts 134 secure the strap 133 to the respective blocks 131 and 132 and also prevent the snubber from moving longitudinally relative to the strut 2.

The side of the engine remote from the mounting strut 2, and which carries the various accessories, such as the carburetor 21, magneto 23, spark plug 26, etc., is enclosed by a cover 109a secured to the engine housing by bolts 33a, one of which is shown in Fig. 6 threaded into a boss on the clutch cover plate 33. The cover 109a is dished and has its concave side toward the engine 20 and partially encloses said engine. Suitable openings are provided in the cover 109a, as shown, to fit the same over the engine accessories, where required.

The disc wheel 109 has a peripheral flange 140 (Fig. 6) to which a conventional wheel rim 141 is secured by a plurality of rivets 142. A tire 143 is shown mounted upon the rim 141 and an inner tube 144 is shown within said tire. The cover 109a is smaller in diameter than the wheel rim 141 so that the tire 143 can be removed without removing the cover 109a or any other parts of the unit. As the wheel 109 is rotated, and the tire 143 encounters a rough area or stone in the road over which the bicycle is being ridden, the strut 2 pivots on the shackle bolt 127 and the shock of the wheel passing over the same is absorbed by the frictionally retarded movement of the spring 129 within the snubber 130, so that road shocks are substantially absorbed and are not transmitted to the rider through the handle bar 6 or the frame 4 of the bicycle, thereby affording a maximum of comfort to the rider.

Highly satisfactory cooling of the engine 20 is effected through the provision of two sets of cooling blades on the disc wheel 109. One set of six radial blades 155 is provided by striking blade portions 156 outwardly from the flat zone 157 of the disc wheel 109 and simultaneously forming air inlet openings 156a. The blades 156 are disposed adjacent the inner marginal portion of the wheel 109 but outwardly of the brake drum 108 and project at an angle of about 45° relative to the plane of the flat zone 157. The other set of blades 158 consists of eight pieces of angle iron 159 arranged adjacent the outer peripheral flange portion 140 and secured to the angular or outwardly dished portion 160 of the wheel 109 by a plurality of rivets 161. It will be understood that the number of blades in the sets 155 and 158 can be varied to meet the cooling requirements of any given engine.

As the wheel 109 rotates, the set of blades 155 forces air into the concavity of the disc wheel 109, while the set of blades 158 forces air out of the concavity and tends to create a partial vacuum aiding in drawing air into the concavity through the openings 156a. The sets of blades 155 and 158 cause the air to travel across the cooling fins of the engine cylinder 24 and cylinder head 25 to effect efficient cooling thereof. The air thus set in motion passes through the openings in the cover plate 109a provided to fit the same over the magneto 23, carburetor 21, etc., at one side of the power wheel, although some air will also pass through the space between the wheel rim 141 and the adjacent edge of the cover plate 109a.

The power wheel unit is complete even to the extent of including a mud guard 162 for the wheel 109. The mud guard 162 is supported by a pair of braces 163 and 164 (Fig. 2) disposed only upon the strut side of the wheel 109 and secured to the strut 2 by a cap screw 165.

It will be understood that changes in the details of construction and in the arrangement of the motorized wheel and strut disclosed herein may be made without departing from the spirit of the invention or the scope of the annexed claims.

I claim:

1. A motor wheel, comprising: an engine including a crankshaft and a housing for said crankshaft; a stationary solid stub shaft carried by said crankshaft housing and projecting therefrom substantially in endwise axial alignment with the axis of rotation of said crankshaft; a road wheel rotatably mounted upon said stub shaft; and means including a counter-shaft driven from said crankshaft drivingly interconnecting said crankshaft and road wheel.

2. A motor wheel, comprising: an engine having a crankshaft, and a housing for said crankshaft; one end of said crankshaft extending through one side of said housing; a stationary solid stub shaft carried by and projecting from the opposite side of said housing in substantially endwise axial alignment with the axis of rotation of said crankshaft; a road wheel having a hub portion rotatably mounted upon said stub shaft; and means including a counter-shaft driven from said crankshaft drivingly interconnecting said one end of said crankshaft with said road wheel hub portion.

3. A motor wheel, comprising: an engine having a crankshaft and a crankcase for said crankshaft; one end of said crankshaft extending through one side of said crankcase; a stationary solid stub shaft carried by and projecting from the opposite side of said crankcase substantially in endwise axial alignment with the axis of rotation of said crankshaft; a road wheel rotatably mounted upon said stub shaft; and a speed reducing transmission mechanism drivingly interconnecting said one end of said crankshaft with said road wheel.

4. A motor wheel unit, comprising: an engine including a housing; a stationary stub shaft carried by said housing and projecting horizontally from one side of said housing; a dish-shaped disc-type road wheel; means on said stub shaft connected with said road wheel constituting the sole means for rotatably mounting said road wheel upon said stub shaft; means including a countershaft drivingly interconnecting said engine and road wheel; and a mounting strut connected with said stub shaft axially outwardly of said wheel and said driving connection with said road wheel.

5. A motor wheel unit, comprising: an engine including a housing; a stationary stub shaft carried by said housing and projecting from only one side of said housing; a road wheel rotatably mounted upon said stub shaft; means for transmitting a drive from said engine to said road wheel; a column-like mounting strut located on one side of said wheel, said strut being disposed perpendicular to said stub shaft and connected with said stub shaft axially outwardly of said wheel; and shock absorbing means arranged between said mounting strut and stub shaft for absorbing road shocks.

6. A motor wheel unit, comprising: an engine including a housing member; a supporting bar projecting outwardly from said housing member; a road wheel rotatably mounted upon said supporting bar; an arm having one end thereof nonrotatably secured to said supporting bar in a region located axially outwardly of said road wheel; means connected with said road wheel inwardly of said arm for driving said road wheel from said engine; a generally upright column-like mounting strut located on one side of said road wheel, said strut being disposed perpendicular to said supporting bar and having the lower end thereof pivotally connected with the opposite end of said arm; and means operatively associated with said strut and arm for absorbing road shocks.

7. A motor wheel unit, comprising: an engine including a housing member; a supporting bar projecting outwardly from said housing member; a road wheel rotatably mounted upon said supporting bar; an arm having one end thereof keyed directly to said supporting bar in a region located axially outwardly of said road wheel; means connected with said road wheel inwardly of said arm for driving said road wheel from said engine; a generally upright column-like mounting strut located on one side of said road wheel, said strut being disposed perpendicular to said supporting bar and having the lower end thereof pivotally connected with the opposite end of said arm; means operatively arranged between said supporting bar and mounting strut for absorbing road shocks; and means carried by the upper end of said mounting strut for attaching the unit to a frame.

8. A power plant, comprising: an internal combustion engine having a housing including a cylinder at one end thereof, a piston in said cylinder, a crankshaft rotatably mounted in the other end of said housing, and a connecting rod attached at one end to the crankshaft and at its other end to said piston; a stationary supporting shaft arranged substantially in endwise axial alignment with the axis of rotation of said crankshaft and projecting from one side of said housing; a driven member having a hub portion rotatably mounted upon said supporting shaft and being rotatable relative to said housing; and means including a counter-shaft for transmitting driving torque from said crankshaft to said hub portion of said driven member.

9. A power plant as defined in claim 8, in which the cylinder is disposed upon one side of the stationary supporting shaft and the torque transmitting means includes a clutch disposed upon the diametrically opposite side of said stationary supporting shaft, whereby the weight of the engine and torque transmitting means are substantially uniformly distributed upon the opposite sides of said stationary supporting shaft.

10. A motor wheel, comprising: an engine having a housing; a stationary stub shaft carried by said housing; a road wheel; means rotatably supporting said road wheel upon said stub shaft serving as the sole mounting means for said road wheel, said means including a sleeve having a radial flange at one end thereof; means securing said road wheel to said flange; a brake drum secured to said road wheel outwardly of said flange; means for drivingly interconnecting said engine and road wheel; and brake means cooperating with said brake drum adapted to retard rotation of said road wheel.

11. A motor wheel, comprising: an engine having a housing; a stationary stub shaft carried by said housing; a disc-type road wheel having one side thereof disposed adjacent said engine; means rotatably supporting said road wheel upon said stub shaft; means for drivingly interconnecting said engine and road wheel; a brake drum secured to said road wheel and disposed axially outwardly thereof; brake means cooperating with said brake drum adapted to retard rotation of said road wheel, said road wheel having a plurality of openings formed therein radially outwardly of said brake drum; and blades on the brake drum side of said road wheel arranged to force air into said openings to effect cooling of said engine as said road wheel is rotated.

12. A motor wheel, comprising: an engine; a road wheel rotatably mounted relative to said engine, said road wheel comprising a concave disc having its concave side disposed adjacent said engine, said disc having openings and a set of blades arranged on the convex side thereof for forcing air through said openings into the concavity of said disc to cool said engine as said road wheel is rotated, said disc having another set of blades on the concave side thereof for forcing air out of said concavity and over said engine as said wheel is rotated; and means drivingly interconnecting said engine and road wheel.

13. A motor wheel, comprising: an engine including a cylinder having a head at one end thereof and a crankcase at the opposite end thereof, a piston slidably mounted in said cylinder, a crankshaft rotatably mounted in said crankcase, a connecting rod connecting said piston to said crankshaft, and a driving sprocket secured to said crankshaft; a solid mounting bar projecting outwardly from said crankcase substantially in endwise axial alignment with the axis of rotation of said crankshaft; a road wheel mounted upon said mounting bar for rotation relative thereto; and means for transmitting a drive from said driving sprocket to said road wheel.

14. A motor wheel, comprising: an engine having a crankshaft and a crankcase for said crankshaft, said crankshaft extending through one side of said crankcase and having a driving sprocket mounted thereon; a stationary supporting shaft extending from the opposite side of said crankcase in axial alignment with said crankshaft; a road wheel; means rotatably supporting said road wheel on said supporting shaft; a driven sprocket carried by said wheel supporting means; and means drivingly interconnecting said driving and driven sprockets, said last-mentioned means including a clutch.

15. A motor wheel, comprising: an engine having a crankshaft and a crankcase for said crankshaft, said crankshaft extending through one side of said crankcase and having a driving sprocket mounted thereon; a stationary stub shaft extending outwardly from the opposite side of said crankcase substantially in axial alignment with said crankshaft; a road wheel; means rotatably supporting said road wheel on said stub shaft, said road wheel supporting means including a sleeve; a driven sprocket fixed on said sleeve; a countershaft arranged parallel with said crankshaft; a clutch including an element non-rotatably mounted upon said countershaft; a clutch sprocket rotatable relative to said countershaft; a chain drivingly interconnecting said drive sprocket with said clutch sprocket; means for frictionally engaging said clutch sprocket with said clutch element to impart rotation to said countershaft; means for engaging and disengaging said clutch; a sprocket fixedly mounted upon said countershaft; and a chain drivingly interconnecting said last-mentioned sprocket with said driven sprocket on said wheel mounting means.

16. A motor wheel unit, comprising: an engine having a crankshaft and a crankcase for said crankshaft, said crankshaft extending through one side of said crankcase and having a driving sprocket mounted thereon; a stub shaft formed integral with and extending outwardly from the opposite side of said crankcase and in axial alignment with said crankshaft; a road wheel; means rotatably supporting said road wheel on said stub shaft, said road wheel supporting means including a sleeve; a driven sprocket fixed on said sleeve; a countershaft arranged parallel with said crankshaft; a clutch including an element non-rotatably mounted upon said countershaft; a clutch sprocket rotatable relative to said countershaft; a chain drivingly interconnecting said drive sprocket with said clutch sprocket; means for frictionally engaging said clutch sprocket with said clutch element to impart rotation to said countershaft; means for engaging and disengaging said clutch; a sprocket fixedly mounted upon said countershaft; a chain drivingly interconnecting said last-mentioned sprocket with said driven sprocket on said wheel mounting sleeve; a mounting strut connected with said stub shaft axially outwardly of said wheel; and means carried by said strut for securing the same to a vehicle frame.

17. A motor wheel unit, comprising: an engine including a housing member; a supporting bar projecting outwardly from said housing member; a road wheel rotatably mounted upon said supporting bar; a mounting strut for said unit including a lower strut member non-rotatably secured to said supporting bar on one side of said road wheel in a region axially outwardly of said road wheel, a generally upright column-like upper strut member located on said one side of said road wheel, said mounting strut being disposed perpendicularly to said supporting bar, and means between said upper and lower strut members operatively associated therewith for absorbing road shocks; and means connected with said road wheel inwardly of said lower strut member for driving said road wheel from said engine.

18. A motor wheel unit as defined in claim 17, including means carried by the upper end of the mounting strut for attaching the unit to a frame.

19. A motor wheel unit as defined in claim 17, including a post carried by the upper end of said mounting strut adapted to be received in a conventional fork opening at the forward end of a bicycle frame for attaching the unit to said frame.

20. A motor wheel unit as defined in claim 17, including an arm fixed to the upper end of the mounting strut and extending toward and overlying the road wheel; and a post mounted in said arm in vertical alignment with said road wheel, said post being adapted to be received in a conventional fork opening at the forward end of a bicycle frame for attaching the unit to said frame.

HENRY A. SHERWOOD.

REFERENCES CITED

The following references are of record in the file of this patent:

UNITED STATES PATENTS

| Number | Name | Date |
| --- | --- | --- |
| 441,417 | Jeffery | Nov. 25, 1890 |
| 904,721 | Perillard | Nov. 24, 1908 |
| 1,247,752 | Van Antwerp | Nov. 27, 1917 |
| 1,308,602 | Mennesson | July 1, 1919 |
| 1,347,055 | Peterson | July 20, 1920 |
| 1,421,545 | Osborn | July 4, 1922 |
| 1,811,394 | Hornsby | June 23, 1931 |
| 1,834,308 | Harley | Dec. 1, 1931 |
| 2,127,384 | Anthony | Aug. 16, 1938 |
| 2,432,107 | Williams | Dec. 9, 1947 |

FOREIGN PATENTS

| Number | Country | Date |
| --- | --- | --- |
| 141,866 | Great Britain | Apr. 29, 1920 |
| 526,193 | Great Britain | Sept. 12, 1940 |